No. 891,896. PATENTED JUNE 30, 1908.
C. E. ACKER.
PROCESS OF MAKING CARBON TETRACHLORID.
APPLICATION FILED JULY 18, 1904. RENEWED DEC. 4, 1907.
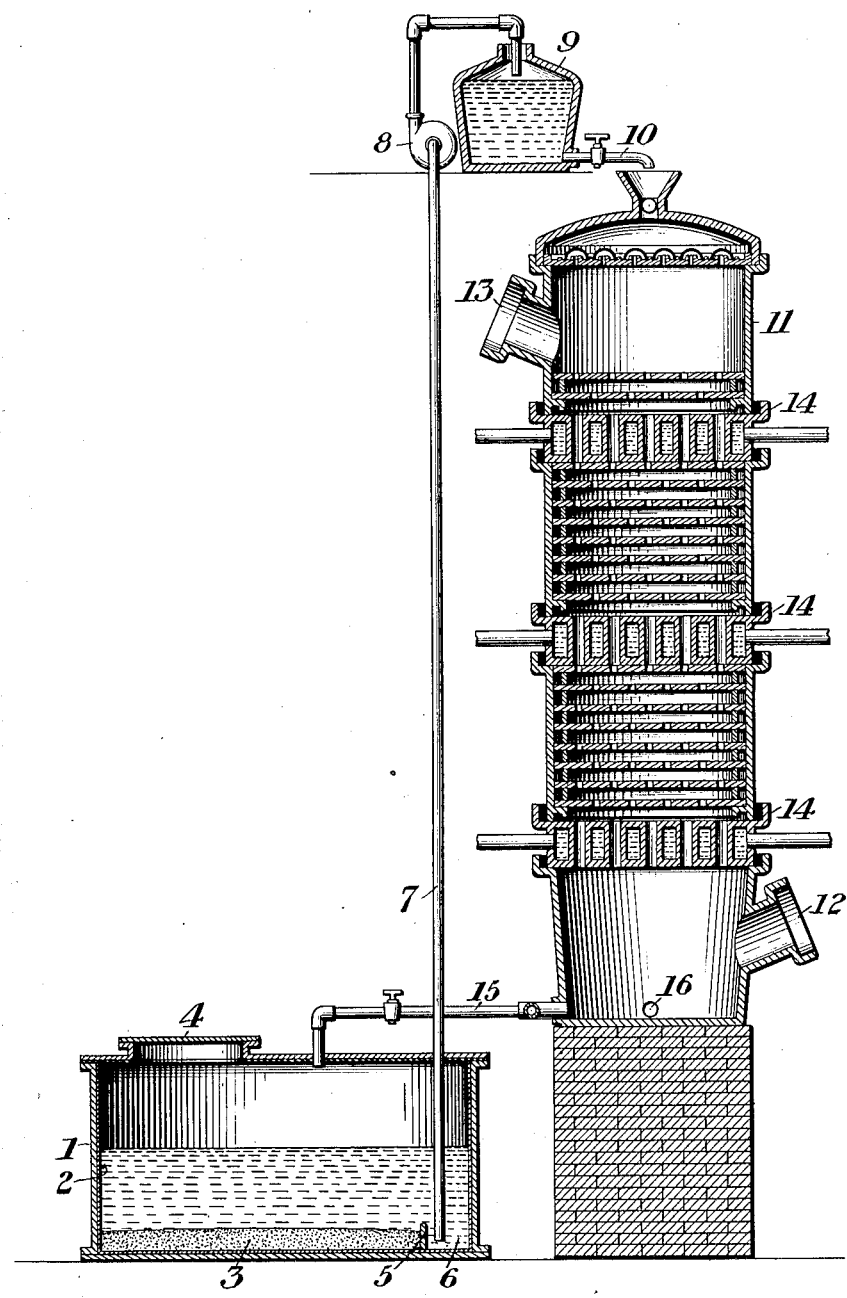
Witnesses:
Inventor:
Charles E. Acker,
by Byrnes & Townsend,
Att'ys.

UNITED STATES PATENT OFFICE.

CHARLES ERNEST ACKER, OF NIAGARA FALLS, NEW YORK, ASSIGNOR, BY MESNE ASSIGNMENTS, TO MARCUS STINE, OF NEW YORK, N. Y.

PROCESS OF MAKING CARBON TETRACHLORID.

No. 891,896.      Specification of Letters Patent.      Patented June 30, 1908.

Application filed July 18, 1904, Serial No. 217,127. Renewed December 4, 1907. Serial No. 405,097.

*To all whom it may concern:*

Be it known that I, CHARLES ERNEST ACKER, a citizen of the United States, residing at Niagara Falls, in the county of Niagara and State of New York, have invented certain new and useful Improvements in Processes of Making Carbon Tetrachlorid, of which the following is a specification.

In an application Serial Number 217,126, filed July 18th, 1904, I have described and claimed a process of producing sulfur chlorids by subjecting a solution of sulfur in sulfur chlorid to the action of a gaseous body containing chlorin, dissolving more sulfur in the product and repeating the cycle of operations.

According to the present process, the sulfur chlorid produced by the specified method is caused to react on carbon disulfid to produce carbon tetrachlorid and sulfur. The sulfur is then redissolved in sulfur chlorid and the cycle is continuously repeated.

An apparatus for carrying out the first stage of the process is shown in the accompanying drawing, in which the figure is a vertical section through the solution tank, storage reservoir and reaction tower.

The tank 1 in which the solution of the sulfur in the sulfur chlorid is effected, is preferably an iron vessel with a lining 2 of lead. The sulfur 3 is introduced through an opening 4 and lies on the bottom of the tank, a transverse dam 5 being provided to leave a well 6 for the clear solution. A pipe 7, which may be of hard lead, leads upward from the tank 1 through a pump 8 to the storage reservoir 9. A pipe 10 having a cock delivers the solution into the upper end of the reaction tower 11. This tower is shown as of the Rohrmann type but may be of any preferred construction. The dry chlorin gas, which may contain air or oxygen but should be of fair strength, is introduced into the lower end of the tower through a passage 12 and the waste gases are withdrawn by suction from the upper end through a passage 13. The tower is provided with interposed cooling sections 14 through which water is circulated to remove the heat produced by the chlorination of the dissolved sulfur. The temperature of the liquid is preferably maintained at a point varying from normal to 60° or 70° C. It is, of course, necessary to maintain it below the distillation point of the monochlorid. The liquid is returned to the solution tank by a pipe 15 leading from the lower end of the tower, more sulfur is dissolved therein and the cycle of operations is continuously repeated. A considerable body of sulfur may be maintained in the tank and one tank may be used to supply several reaction towers.

The first stage of the process may be carried out under such conditions that the product is a mixture of sulfur monochlorid and dichlorid. For this purpose, a smaller amount of liquid is passed through the reaction tower and it is subjected to an excess of chlorin. Chlorin may also be introduced directly into the solution tank. It is also necessary to maintain the temperature in the system below the volatilizing point of the dichlorid 68° C., as by passing refrigerated brine through the cooling sections of the tower and jacketing the solution tank.

In the second stage of the process, a portion of the sulfur chlorid or mixture of chlorids is withdrawn from the reaction tower or solution tank and introduced into a digester, which may be of iron lined with lead. Carbon disulfid is also supplied to the digester in amount sufficient to provide one atom of carbon for each four atoms of chlorin in the chlorid or chlorids. The liquids in the digester are then mixed and heated, preferably to about 60° C., until all of the chlorin in the chlorids has combined with the carbon in the sulfid to produce carbon tetrachlorid. The reactions are indicated by the following formulæ:

(1)   $CS_2 + 2S_2Cl_2 = CCl_4 + 6S$.
(2)   $CS_2 + 2SCl_2 = CCl_4 + 4S$.

The carbon tetrachlorid may be distilled off and the sulfur set free by the reaction crystallized out of the residual liquid. This sulfur is then returned to the solution tank and employed to produce further quantities of the sulfur chlorid, the process thus being continuous or cyclical.

I claim:—

1. In the process of making carbon tetra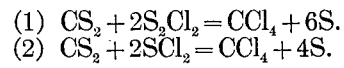chlorid those steps which consist first, in dissolving sulfur in sulfur chlorid; second, subjecting said solution in a finely divided state to the action of a gaseous body containing chlorin, and third, causing the resulting fluid to react on carbon disulfid.

2. In the process of making carbon tetrachlorid those steps which consist first, in dissolving sulfur in sulfur chlorid, second, subjecting said solution in a finely divided state to the action of a gaseous body containing chlorin, third, causing the resulting fluid to react on carbon disulfid and fourth, dissolving the sulfur freed by the reaction in sulfur chlorid.

3. In the process of making carbon tetrachlorid those steps which consist first, in dissolving sulfur in sulfur chlorid, second, subjecting said solution in a finely divided state to the action of a gaseous body containing chlorin, third, causing the resulting fluid to react on carbon disulfid, and fourth distilling off the carbon tetrachlorid.

4. In the process of making carbon tetrachlorid those steps which consist first in dissolving sulfur in sulfur chlorid, second, subjecting said solution in a finely divided state to the action of a gaseous body containing chlorin, third, causing the resulting fluid to react on carbon disulfid, fourth, distilling off the carbon tetrachlorid, and fifth, dissolving the residual sulfur in sulfur chlorid.

5. In the process of making carbon tetrachlorid those steps which consist first in dissolving sulfur in sulfur chlorid, second, subjecting said solution in a finely divided state to the action of a gaseous body containing chlorin, third, causing the resulting fluid to react on carbon disulfid, fourth, distilling off the carbon tetrachlorid, and fifth, dissolving the residual sulfur in sulfur chlorid and repeating the cycle of operations.

6. In the process of making carbon tetrachlorid those steps which consist first in dissolving sulfur in sulfur chlorid, second, subjecting said solution in a finely divided state to the action of a gaseous body containing chlorin and a diluent, and third causing the resulting fluid to react on carbon disulfid.

In testimony whereof, I affix my signature in presence of two witnesses.

CHARLES ERNEST ACKER.

Witnesses:
GERALDINE M. McBRIDE,
JOSEPHINE F. KEOUGH.